(12) United States Patent
Saur et al.

(10) Patent No.: US 11,715,376 B2
(45) Date of Patent: Aug. 1, 2023

(54) IMPROVING OPERATION OF WIRELESS COMMUNICATION NETWORKS FOR DETECTING VULNERABLE ROAD USERS

(71) Applicant: Nokia Technologies Oy, Espoo (FI)

(72) Inventors: Stephan Saur, Stuttgart (DE); Silvio Mandelli, Tamm (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/427,159

(22) PCT Filed: Feb. 4, 2019

(86) PCT No.: PCT/EP2019/052652
§ 371 (c)(1),
(2) Date: Jul. 30, 2021

(87) PCT Pub. No.: WO2020/160748
PCT Pub. Date: Aug. 13, 2020

(65) Prior Publication Data
US 2022/0101732 A1 Mar. 31, 2022

(51) Int. Cl.
*G08G 1/16* (2006.01)
*H04W 4/46* (2018.01)

(52) U.S. Cl.
CPC ............ *G08G 1/162* (2013.01); *G08G 1/163* (2013.01); *G08G 1/166* (2013.01); *H04W 4/46* (2018.02)

(58) Field of Classification Search
None
See application file for complete search history.

(56) References Cited

U.S. PATENT DOCUMENTS 6,337,637 B1 * 1/2002 Kubota .................. B60T 7/18
340/901
9,805,474 B1 * 10/2017 Whiting .................. G06T 7/20
(Continued)

FOREIGN PATENT DOCUMENTS

DE 102016226051 A1 * 6/2018
KR 20130068159 A * 6/2013 .............. H04W 4/02
WO 2018/128946 A1 7/2018

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 15)", 3GPP TS 36.355, V15.1.0, Sep. 2018, pp. 1-217.
(Continued)

*Primary Examiner* — Muhammad Adnan
(74) *Attorney, Agent, or Firm* — Brake Hughes Bellermann LLP

(57) ABSTRACT

According to an example aspect of the present invention, there is provided a method comprising determining that a first mobile terminal is a personal device, receiving, from the first mobile terminal, information about a status of the first mobile terminal, determining whether the first mobile terminal is a Vulnerable Road User, VRU, with respect to a vehicle based at least partly on the received information about the status of the first mobile terminal, detecting a potential collision between the first mobile terminal and the vehicle when the first mobile terminal is determined as a VRU and transmitting at least one warning message to the first mobile terminal in case that the first mobile terminal is determined as a VRU and the potential collision is detected.

17 Claims, 9 Drawing Sheets

(56) References Cited

U.S. PATENT DOCUMENTS

| | | | |
|---|---|---|---|
| 9,896,030 B2* | 2/2018 | Sugimoto | H04L 67/52 |
| 10,282,981 B1* | 5/2019 | Nepomuceno | G08G 1/163 |
| 10,304,341 B1* | 5/2019 | Grasso | H04W 4/46 |
| 11,080,993 B1* | 8/2021 | Shuman | G07C 5/008 |
| 11,328,604 B2* | 5/2022 | Ljung Aust | G08G 1/166 |
| 11,594,042 B1* | 2/2023 | Sarti | B60W 30/0953 |
| 2008/0312833 A1* | 12/2008 | Greene | G08G 1/165 |
| | | | 701/301 |
| 2009/0287412 A1* | 11/2009 | Menzel | G01C 21/36 |
| | | | 701/117 |
| 2011/0035476 A1* | 2/2011 | Imbimbo | G08G 1/127 |
| | | | 709/222 |
| 2011/0199199 A1* | 8/2011 | Perkins | B60Q 9/008 |
| | | | 340/435 |
| 2012/0330541 A1* | 12/2012 | Sakugawa | B60W 30/095 |
| | | | 701/301 |
| 2013/0059558 A1* | 3/2013 | Gehlen | G08G 1/162 |
| | | | 455/404.1 |
| 2015/0251599 A1* | 9/2015 | Koravadi | G01S 19/42 |
| | | | 340/903 |
| 2016/0318445 A1* | 11/2016 | Sugimoto | G06F 3/00 |
| 2016/0343256 A1* | 11/2016 | Song | H04W 4/029 |
| 2018/0295481 A1* | 10/2018 | Kahtava | H04W 76/27 |
| 2019/0080607 A1* | 3/2019 | McClain | G08G 1/0116 |
| 2019/0230618 A1* | 7/2019 | Saur | H04W 56/001 |
| 2020/0193829 A1* | 6/2020 | Cheng | G08G 1/168 |
| 2021/0268998 A1* | 9/2021 | Brickwedde | B60W 30/0953 |
| 2021/0284141 A1* | 9/2021 | Sugaya | G08G 1/166 |
| 2022/0068120 A1* | 3/2022 | Alfano | G08G 1/093 |
| 2022/0135027 A1* | 5/2022 | Bravi | G06T 7/246 |
| | | | 701/119 |
| 2022/0383750 A1* | 12/2022 | Sharma Banjade | G08G 1/005 |
| 2022/0388505 A1* | 12/2022 | Sharma Banjade | G08G 1/005 |

OTHER PUBLICATIONS

International Search Report and Written Opinion received for corresponding Patent Cooperation Treaty Application No. PCT/EP2019/052652, dated Oct. 18, 2019, 12 pages.

"Intelligent Transport System (ITS); Vulnerable Road Users (VRU); Study of use cases and standardisation perspectives [Release 2]", Draft ETSI TR 103 300 1/0.0.8, Apr. 2017, pp. 1-46.

Emara et al., "MEC-Assisted End-to-End Latency Evaluations for C-V2X Communications", European Conference on Networks and Communications (EuCNC), Jun. 18-21, 2018, pp. 157-161.

* cited by examiner

IMPROVING OPERATION OF WIRELESS COMMUNICATION NETWORKS FOR DETECTING VULNERABLE ROAD USERS

RELATED APPLICATION

This application claims priority to PCT Application No. PCT/EP2019/052652, filed on Feb. 4, 2019, each of which is incorporated herein by reference in its entirety.

FIELD

Various example embodiments relate in general to communication networks, and improving operation of such networks for detecting vulnerable road users.

BACKGROUND

Wireless communication networks may be exploited for warning and protecting Vulnerable Road Users, VRUs, such as pedestrians, cyclists, or wheelchair drivers. As an example, wireless communication networks may be used to provide precise positioning and tracking of road users to anticipate potential collisions and to release warning messages upon detecting potential collisions. Thus, detection of VRUs is considered in the context of various wireless communication networks, such as, for cellular networks operating according to Long Term Evolution, LTE, and/or 5G radio access technology. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5 G/NR.

In general, the purpose of the 3GPP is to improve operation of wireless communication networks. More specifically, improving operation for detecting VRUs is a hot topic nowadays in the 3GPP discussions and there is a need to provide improved methods, apparatuses and computer programs for detecting VRUs. Similar improvements may also be useful in several other wireless communication networks as well.

SUMMARY

According to some aspects, there is provided the subject-matter of the independent claims. Some embodiments are defined in the dependent claims.

According to a first aspect, there is provided a first method for a network unit, comprising determining that a first mobile terminal is a personal device, receiving, from the first mobile terminal, information about a status of the first mobile terminal, determining whether the first mobile terminal is a Vulnerable Road User, VRU, with respect to a vehicle based at least partly on the received information about the status of the first mobile terminal, detecting a potential collision between the first mobile terminal and the vehicle when the first mobile terminal is determined as a VRU and transmitting at least one warning message to the first mobile terminal in case that the first mobile terminal is determined as a VRU and the potential collision is detected.

According to the first aspect, the received information about the status of the first mobile terminal may comprise an estimate indicating whether the first mobile terminal is a VRU with respect to the vehicle. Also, the received information about the status of the first mobile terminal may comprise confidence information associated with estimated correctness of the estimate.

According to the first aspect, the received information about the status of the first mobile terminal may comprise information related to the connectivity indicating whether the first mobile terminal is associated with a wireless network of the vehicle.

According to the first aspect, the first method may comprise determining that a second mobile terminal is associated with the vehicle.

According to the first aspect, the first method may comprise receiving information about a status of a second mobile terminal or information about the vehicle and determining whether the first mobile terminal is a VRU with respect to the vehicle based at least partly on the received information about the status of the second mobile terminal or information about the vehicle.

Also, the received information about the status of the first mobile terminal may comprise a location of the first mobile terminal, the method further comprising receiving information about a size and location of the vehicle from the second mobile terminal or from the vehicle and determining whether the first mobile terminal is a VRU based on the location of the first mobile terminal and the size and location of the vehicle.

According to the first aspect, the first method may comprise estimating whether the first mobile terminal is within the vehicle based on the location of the first mobile terminal and the size and location of the vehicle and determining that the first mobile terminal is a VRU when the first mobile terminal is not within the vehicle.

According to the first aspect, the received information about the status of the first mobile terminal may comprise a speed of the first mobile terminal, the method further comprising, receiving information about a speed of the vehicle or a speed of a second mobile terminal and determining whether the first mobile terminal is a VRU based on the speed of the first mobile terminal and the speed of the vehicle or a second mobile terminal.

According to the first aspect, the first method may comprise receiving information about a status of a second mobile terminal or the vehicle, identifying, based at least partly on the received information about the status of the second mobile terminal or the vehicle, at least one mobile terminal that is in proximity of the second mobile terminal or the road user and transmitting at least a part of the information about the status of the second mobile terminal or the vehicle to the identified at least one mobile terminal.

According to the first aspect, the first method may comprise transmitting, to the first mobile terminal, an estimate indicating whether the first mobile terminal is determined as a VRU with respect to the vehicle and confidence information associated with estimated correctness of the estimate.

According to the first aspect, the first method may comprise the personal device is a handheld or a wearable device but not associated with any vehicle.

According to a second aspect, there is provided a second method comprising determining information about a status of the first mobile terminal, wherein the information is suitable for determining at a network unit whether the first mobile terminal is a Vulnerable Road User, VRU, with respect to a vehicle, transmitting the information about the status of the first mobile terminal to the network unit and receiving at least one warning message from the network unit in case that the first mobile terminal is determined as a VRU and a potential collision is detected.

According to the second aspect, the transmitted information about the status of the first terminal may comprise an estimate indicating whether the first mobile terminal is a VRU with respect to the vehicle. Also, the transmitted information about the status of the first terminal may comprise confidence information associated with estimated correctness of the estimate.

According to the second aspect, the transmitted information about the status of the first terminal may comprise a location of the first mobile terminal, a speed of the first mobile terminal and/or information related to the connectivity indicating whether the first mobile terminal is associated with a wireless network of the vehicle.

According to the second aspect, the second method may comprise receiving, from a second mobile terminal associated with the vehicle or from the network unit, information about a status of the second mobile terminal or information about the vehicle and determining whether the first mobile terminal is a VRU based on the received information. Also, the information about the status of the second mobile terminal or the information about the vehicle may comprise a speed, location and/or direction of the second mobile terminal or the vehicle.

According to the second aspect, the second method may comprise receiving, from the network unit, an estimate indicating whether the first mobile terminal is determined as a VRU with respect to the vehicle and confidence information associated with estimated correctness of the estimate.

According to a third aspect of the present invention, there is provided an apparatus comprising at least one processing core, at least one memory including computer program code, the at least one memory and the computer program code being configured to, with the at least one processing core, cause the apparatus at least to perform the first method.

According to a fourth aspect of the present invention, there is provided an apparatus comprising at least one processing core, at least one memory including computer program code, the at least one memory and the computer program code being configured to, with the at least one processing core, cause the apparatus at least to perform the second method.

According to a fifth aspect of the present invention, there is provided an apparatus comprising means for performing the first method. According to a sixth aspect of the present invention, there is provided an apparatus comprising means for performing the second method.

According to a seventh aspect of the present invention, there is provided non-transitory computer readable medium having stored thereon a set of computer readable instructions that, when executed by at least one processor, cause an apparatus to at least perform the first method. According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

EMBODIMENTS

Operation of wireless communication networks for detecting Vulnerable Road Users, VRUs, may be improved by the procedures described herein. More specifically, a first mobile terminal may be determined as a VRU based on a status of the first mobile terminal. For instance, a network unit may determine whether the first mobile terminal is a VRU, or not, based on received information about the status of the first mobile terminal. The network unit may also detect a potential collision involving the first mobile terminal. Consequently, if the network unit determines the first mobile terminal as a VRU and detects the potential collision, the network unit may transmit warning messages to the first mobile terminal. That is to say, being a VRU may not be enough for transmitting warning messages because in such a case all pedestrians in a dense urban environment would receive warning messages all the time. In some embodiments, the network unit may also transmit warning messages to a road user, such as vehicle, involved in the potential collision.

Determining that the first mobile terminal is a VRU may be exploited to improve other services and used for other purposes. For example, traffic lights may be controlled and street illumination adapted depending on the distribution of VRUs and other road users. Moreover, in some embodiments, speed limitations may be adapted according to such road context, e.g., a lower speed may be enforced in presence of pedestrians and/or bikers.

Figure 1:
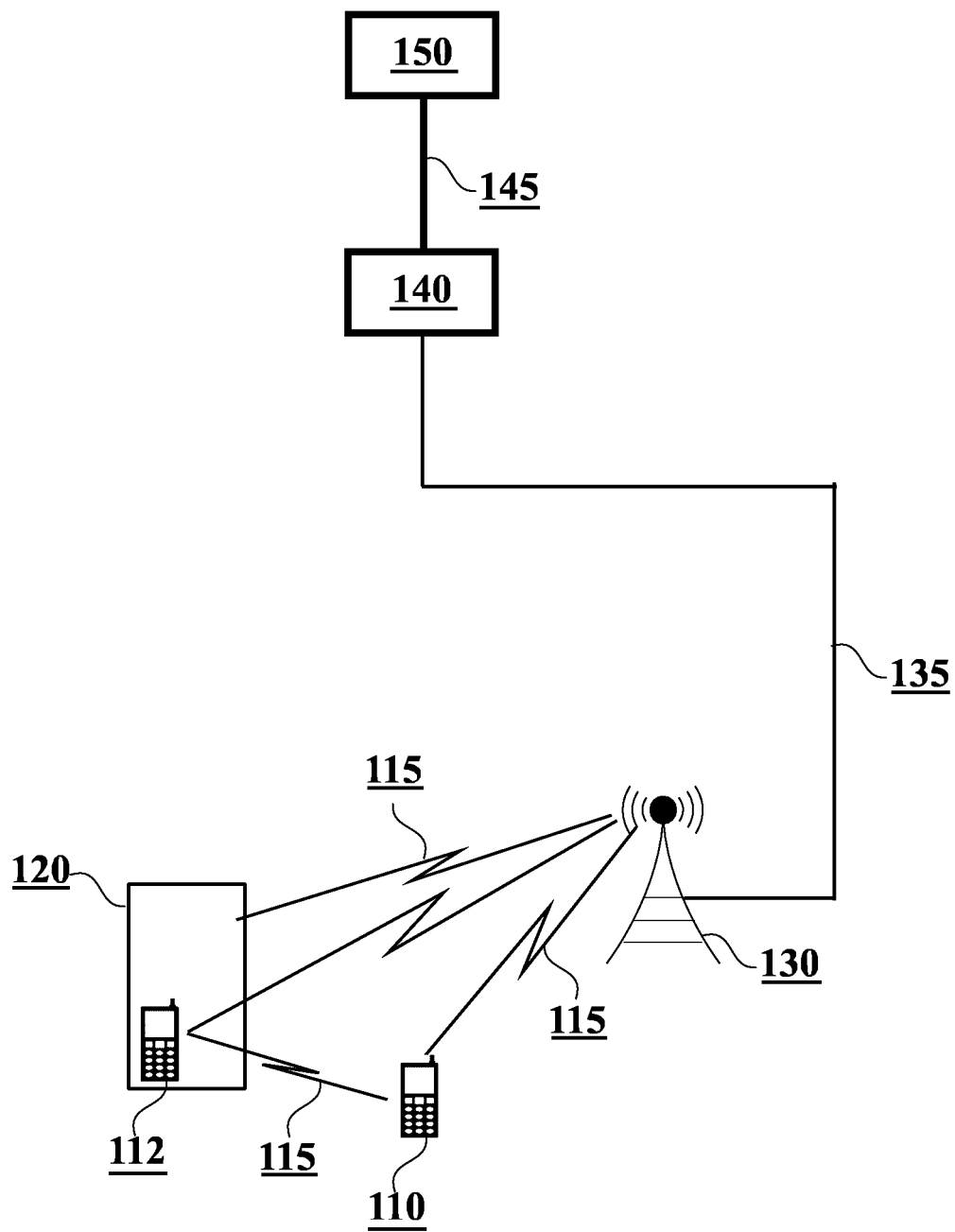
FIG. 1 illustrates an exemplary network scenario in accordance with at least some embodiments.

FIG. 1 illustrates an exemplary network scenario in accordance with at least some embodiments. According to the exemplary scenario of FIG. 1, there may be a wireless communication system, which comprises first mobile terminal 110, second mobile terminal 112, vehicle 120, Base Station, BS, 130, core network element 140 and network unit 150. First mobile terminal 110, second mobile terminal 112 and vehicle 120 may be referred to as road users. In some embodiments, a potential collision between first mobile terminal 110 and vehicle 120 may be detected and first mobile terminal 110 may be determined as a VRU. Consequently, warning messages may be transmitted to first mobile terminal 110 and, possibly, to vehicle 120 as well.

Mobile terminals 110 and 112 may be connected to BS 130 via air interface 115. However, in some embodiments, mobile terminals 110 and 112 may also be connected to different BSs and/or use different air interfaces for communication.

Mobile terminals 110 and 112 may comprise, for example, a User Equipment, UE, a smartphone, a cellular phone, a Machine-to-Machine, M2M, node, Machine-Type Communications node, MTC, an Internet of Things, IoT, node, a car telemetry unit, a laptop computer, a tablet computer or, indeed, any kind of suitable wireless mobile terminal. In general, first mobile terminal 110 may be a personal device, such as a handheld or a wearable device, which is not associated with vehicle 120 or any other vehicle. Second mobile terminal 112 may be associated with vehicle 120. That is to say, second mobile terminal 112 may be for example embedded in vehicle 120. In some embodiments, second mobile terminal 112 may not be a personal device.

In the exemplary network scenario of FIG. 1, mobile terminals 110 and 112 may communicate wirelessly with BS 130, or a cell of BS 130, via air interface 115. Mobile terminals 110 and 112 may also communicate wirelessly with each other over air interface 115, or some other air interface. Air interface 115 between mobile terminals 110, 112 and BS 130 may be configured in accordance with a Radio Access Technology, RAT, which UEs 110, 112 and BS 130 are configured to support.

Examples of cellular RATs include Long Term Evolution, LTE, New Radio, NR, which may also be known as fifth generation, 5G, radio access technology and MulteFire. On the other hand, examples of non-cellular RATs include Wireless Local Area Network, WLAN, and Worldwide Interoperability for Microwave Access, WiMAX. For example, in the context of LTE, BS 130 may be referred to as eNB while in the context of NR, BS 130 may be referred to as gNB. Also, for example in the context of WLAN, BS 130 may be referred to as an access point. Mobile terminals 110 and 112 may be similarly referred to as UEs, e.g., in the context of LTE and NR. In any case, embodiments are not restricted to any particular wireless technology.

BS 130 may be connected, directly or via at least one intermediate node, with core network 140 via interface 135. Core network 140 may be, in turn, coupled via interface 145 with another network (not shown in FIG. 1), via which connectivity to further networks may be obtained, for example via a worldwide interconnection network. BS 130 may be connected with at least one other BS as well via an inter-base station interface (not shown in FIG. 1), even though in some embodiments the inter-base station interface may be absent. BS 130 may be connected, directly or via at least one intermediate node, with core network 140 or with another core network.

According to the exemplary network scenario, the wireless communication system may also comprise network unit 150. Network unit 150 may collect, process and distribute all relevant information concerning localization and collision prediction of road users. For instance, network unit 150 may receive information from mobile terminals 110 and 112 via BS 130 and core network 140, and transmit information to mobile terminals 110 and 112 similarly. Network unit 150 may, e.g., determine whether first mobile terminal 110 is a VRU and decide to transmit warning messages to first mobile terminal 110 if first mobile terminal is determined as a VRU and a potential collision involving first mobile terminal 110 and for example vehicle 120 has been detected.

In some embodiments, network unit 150 may be referred to as a location server. For example, in the context of 3rd Generation Partnership Project, 3GPP, network unit may comprise Evolved Serving Mobile Location Center, E-SMLC. Thus, in some embodiments, network unit 150 may communicate with the mobile terminals 110 and 112 through the LTE Positioning Protocol, LPP, as specified in 3GPP TS 36.355 Rel-15 or a corresponding 5G protocol for example. In some embodiments, network unit 150 may also be referred to a Mobile Edge Cloud, MEC. That is to say, functions and actions may be implemented in a MEC, e.g., for road user tracking and collision prediction.

Network unit 150 may be located anywhere in the communication system. That is to say, even though according to the exemplary network scenario of FIG. 1 network unit 150 is located in a certain position, embodiments of the present invention are not limited to any specific position of network unit 150. For instance, network unit 150 may also be in BS 130 or in core network 140, or in any other network which is connected to mobile terminals 110 and 112.

Localization of road users, comprising vehicles and mobile terminals such as VRUs, may be performed by network unit 150, e.g., at the E-SMLC or the MEC application. Localization may be done RAT-dependent, for example, by utilizing measurements of Reference Signals, RS, or RAT-independent by utilizing Global Positioning System, GPS, or similar systems. In some embodiments, mobile terminal 110 and/or mobile terminal 112 may report measurements and/or estimated positions to network unit 150 for localization. Alternatively, or in addition, mobile terminal 110 and/or mobile terminal 112 may transmit to network unit 150 information gathered from their Inertial Measurement Units, IMUs.

Also, tracking of road users may be performed by network unit 150, e.g., at the E-SMLC or the MEC application. In some embodiments, a motion model may be exploited to predict future positions of road users based on various assumptions, such as, constant speed or constant turn rate. Predictions of future positions may be then updated by network unit 150 based on new measurements gathered from road users for example. Road users may comprise various sensors, such as a speedometer, accelerometer and/or sensors for measuring orientation of wheels, and provide related measurement results to network unit 150. Alternatively, or in addition, road users may comprise a receiver for receiving GPS signals.

Network unit 150 may also perform collision prediction between road users. For example, network unit 150 may compare anticipated trajectories of road users and determine a probability for a potential collision between the road users based on the comparison. In other words, network unit 150 may determine a probability that two road users, such as first mobile terminal 110 and vehicle 120, are located at the same position at the same point in time in the future. If it is determined that the anticipated trajectories may collide or a probability of collision is high, network unit 150 may determine that there is a potential collision between first mobile terminal 110 and vehicle 120. Thus, if the potential collision is detected and first mobile terminal 110 is determined as a VRU, for example as a pedestrian but not a passenger in vehicle 120, network unit 150 may start transmitting warning messages to mobile terminal 110, and possible to vehicle 120. Therefore, unnecessary warning messages to false VRUs, e.g., to passengers in vehicle 120, can be avoided, thereby reducing signalling load. That is to say, some embodiments help to determine a likelihood that a mobile terminal, such as first mobile terminal 110, is a VRU or not. Such information may be used for making better decision, for example whether to consider the mobile terminal in question in collision prediction and decide whether to transmit warning messages to the mobile terminal.

In some embodiments, if the probability exceeds a certain threshold, network unit 150 may transmit warning messages to the road users. For instance, first mobile terminal 110 may be warned about the upcoming collision. In case of vehicle 120, a driver of vehicle 120 may be warned with a visual or acoustic signal that there is a VRU, such as first mobile terminal 110, nearby on the street, even if the driver cannot yet see the VRU because he is hidden behind an obstacle.

One challenge associated with detection of VRUs is the right classification of road users. In some embodiments, vehicles, such as vehicle 120, may be identified as vehicles via an embedded Subscriber Identity Module, SIM, card. Similarly, in some embodiments, road side units like traffic signs or lamp posts may be identified using an embedded SIM card. The remaining mobile terminals on a street may be personal devices, such as handheld or wearable devices, owned by humans. However, some humans may be VRUs while some may not be VRUs.

As an example, a handheld device may be located on the street approximately in a same location when the human owning the device crosses the street, or when the human owning the handheld device is a passenger in a bus. For instance, if the achievable level of positioning accuracy is around 1 meter, the determined position may be the same in both cases. In some cases, also the speed, turn rate, and direction may be the same. In the first case, when the human owning the device crosses the street, the owner of the device is a VRU, and a respective warning message should be released. On the other hand, in the second case, when the human owning the handheld device is a passenger in a bus, the owner of the device is not a VRU. Thus a warning message should not be released. Hence, the likelihood for determining correctly whether a mobile terminal is a VRU or not should be as high as possible.

Embodiments of the present invention therefore provide improvements for determining whether a mobile terminal is a VRU, or not, correctly. That is to say, embodiments of the present invention enable distinguishing whether a mobile terminal is a true VRU, such as a pedestrian crossing the street, or a false VRU, such as a passenger on a bus, correctly with a high likelihood.

With reference to FIG. 1 again, in some embodiments, the determination whether first mobile terminal 110 is a VRU, or not, may be performed at network unit 150, e.g., at the E-SMLC or the MEC application. First mobile terminal 110 may transmit information, such as information about a status of first mobile terminal 110, to network unit 150 and network unit 150 may determine, or decide, whether first mobile terminal 110 is a VRU, i.e., a true VRU, based on the received information about the status of first mobile terminal 110. First mobile terminal 110 may be determined as a true VRU with respect to a vehicle but a true VRU may not be necessarily related to a vehicle. That is to say, first mobile terminal 110 may be identified by network unit 150 as a true VRU even if there would be no vehicle in the proximity. A false VRU, i.e., a mobile terminal that is determined as not being a VRU, may be related to a vehicle, e.g., a passenger on a bus.

That is to say, based on the received information about the status of first mobile terminal 110, network unit 150 may decide whether to consider first mobile terminal 110 in collision prediction, or not. The transmitted information about the status of first mobile terminal 110 may comprise a location of first mobile terminal 110, a speed of first mobile terminal 110 and/or information related to connectivity, e.g., to indicate whether first mobile terminal 110 is associated with a wireless network of vehicle 120.

Additionally, or alternatively, first mobile terminal 110 may estimate whether it is a VRU, or not, and in such a case the transmitted information about the status of the first terminal may comprise an estimate indicating whether first mobile terminal 110 is a VRU with respect to vehicle 120.

That is to say, first mobile terminal 110 by may be identified as a true VRU if there is a vehicle, such as vehicle 120, in the proximity. Said estimate may be indicated as "VRU: yes or no." Network unit 150 may determine whether first mobile terminal 110 is a VRU with respect to vehicle 120 based on the received estimate as well, e.g., network unit 150 may determine whether to consider first mobile terminal 110 in collision prediction based on the received estimate as well.

In some embodiments, the transmitted information about the status of first mobile terminal 110 may comprise confidence information associated with estimated correctness of the estimate as well. Said confidence information may be any indicator related to a probability that the estimate is correct and the confidence information may be taken into account by network unit 150 for determining whether first mobile terminal 110 is a VRU with respect to vehicle 120.

In some embodiments, first mobile terminal 110 may receive information from other mobile terminals or dedicated transmission points installed in a vehicle, e.g., a WLAN access point or a Bluetooth transmitter. Alternatively, or in addition, first mobile terminal 110 may receive information from network unit 150. Said information may be taken into account by first mobile terminal 110 when determining whether first mobile terminal 110 is a VRU.

The information received by first mobile terminal 110 may comprise, for example, information about a status of a second mobile terminal 112, wherein second mobile terminal 112 may be associated with vehicle 120. Alternatively, or in addition, the information received by first mobile terminal 110 may comprise information about vehicle 120. For example, the information about vehicle 120 may comprise a location, size and/or speed of vehicle 120. Moreover, the size of vehicle 120 may comprise a length and width of vehicle 120. That is to say, the size of vehicle 120 may define dimensions of vehicle 120. In some embodiments, the information about vehicle 120 may comprise a time trace related to a location, size and/or speed of vehicle 120.

In some embodiments, the information about the status of first mobile terminal 110, the status of second mobile terminal 112 and/or about vehicle 120 may be transmitted by extending the LPP. For instance, depending on whether the transmitted information is time-varying, such as speed, and whether it is transmitted in uplink or downlink, the messages "Provide Capabilities", "Provide Assistance Data", and "Provide Location Information" may be extended.

For instance, the "Provide Capabilities"—message may be extended by including information about a type of a mobile terminal to the message, such as vehicle or personal device, wherein a personal device may refer to a handheld device or a wearable device. In case of first mobile terminal 110 the information about a type of first mobile terminal 110 may indicate that first mobile terminal 110 is a personal device and in case of second mobile terminal 112 the information about a type of second mobile terminal 112 may indicate that second mobile terminal 112 is associated with a vehicle. Consequently, in some embodiments, network unit 150 may determine that first mobile terminal 110 is a personal device based on the received information about the type of first mobile terminal 110 and that second mobile terminal 112 is associated with vehicle 120 based on the received information about the type of second mobile terminal 112.

Figure 2:
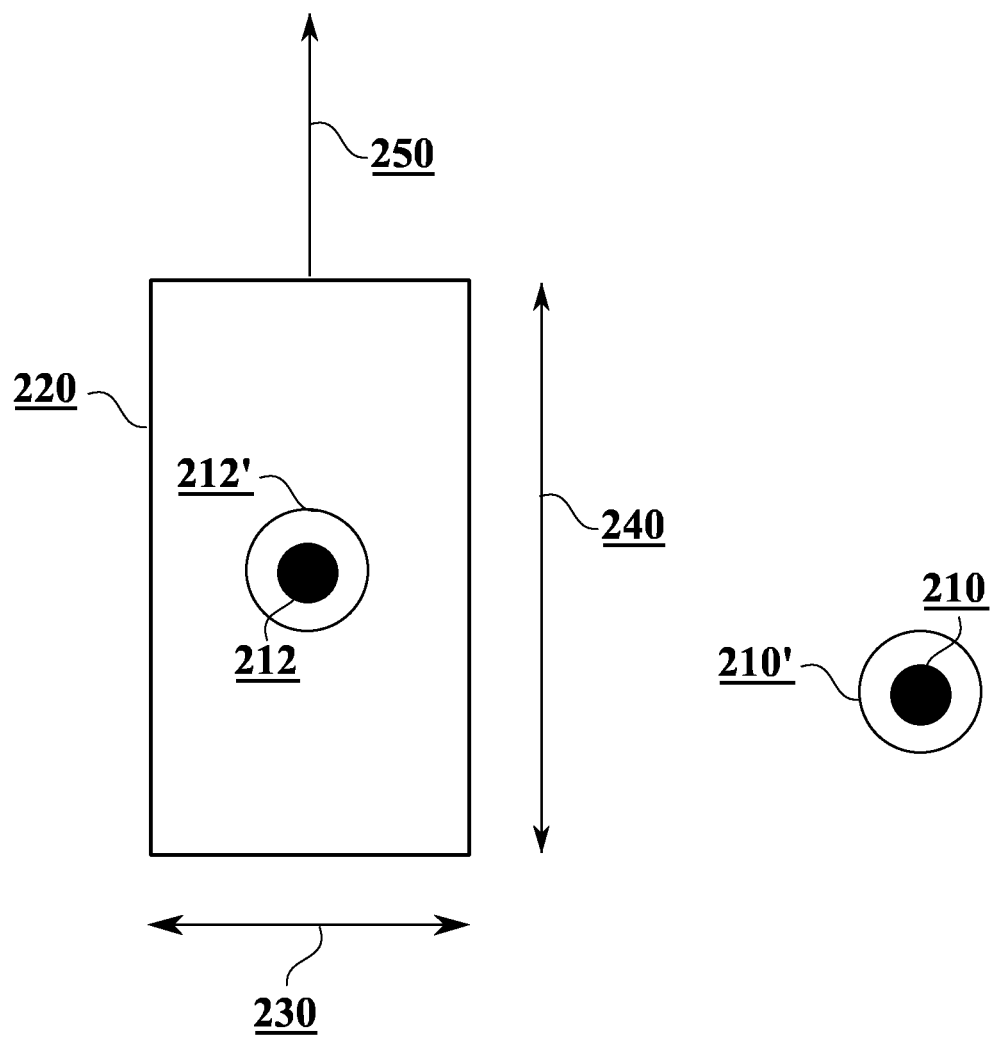
FIG. 2 illustrates a first example about locations of a first mobile terminal and a vehicle in accordance with at least some embodiments.

FIG. 2 illustrates a first example about locations of a first mobile terminal and a vehicle in accordance with at least some embodiments. In FIG. 2 estimated position of the first mobile terminal is denoted by 210, with uncertainty area 210'. Similarly, estimated position of vehicle 220 is denoted by 212, with uncertainty area 212'. The first mobile terminal may correspond to first mobile terminal 110 of FIG. 1. First mobile terminal may be referred to as a first road user while vehicle 220, such as vehicle 120 in FIG. 1, may be referred to as a second road user.

A size of vehicle 220 may comprise a horizontal projection on a road surface, for example, a two-dimensional vector with width 230 (in perpendicular to driving direction 250) and length 240 (in driving direction 250) of vehicle 220. Optionally, in some embodiments, the size of vehicle 220 may comprise a height of vehicle 220.

The size of vehicle 220, i.e., the second road user, may be 2- or 3-dimensional and determine borderlines of vehicle 220. The borderlines of vehicle 220 may define a bounding box of vehicle 220. In some embodiments, estimated position of a vehicle 220 may be in the centre of the bounding box. Moreover, as shown in the first example about locations of the first mobile terminal and the vehicle in FIG. 2, estimated position of first mobile terminal 210 may be outside of the bounding box in some embodiments. In such a case, the first mobile terminal may be determined as a VRU, i.e., a true VRU, by the network unit, such as network unit 150 in FIG. 1. That is to say, the first mobile terminal may be included in collision prediction and if a collision between the first mobile terminal and vehicle 220 is predicted, network unit 150 of FIG. 1 may transmit at least one warning message to the first mobile terminal, and possibly to the vehicle as well.

That is to say, the network unit may make the determination about whether the first mobile terminal is a VRU or not based on determining whether the estimated position of first mobile terminal 210 is located inside or outside of the bounding box of vehicle 220, or based on a distance of the estimated position of the first mobile terminal 210 from the edge of the bounding box of vehicle 220, based on the uncertainty area of the estimated positions 210' and 212' and/or directions of the first mobile terminal and vehicle 120.

Figure 3:
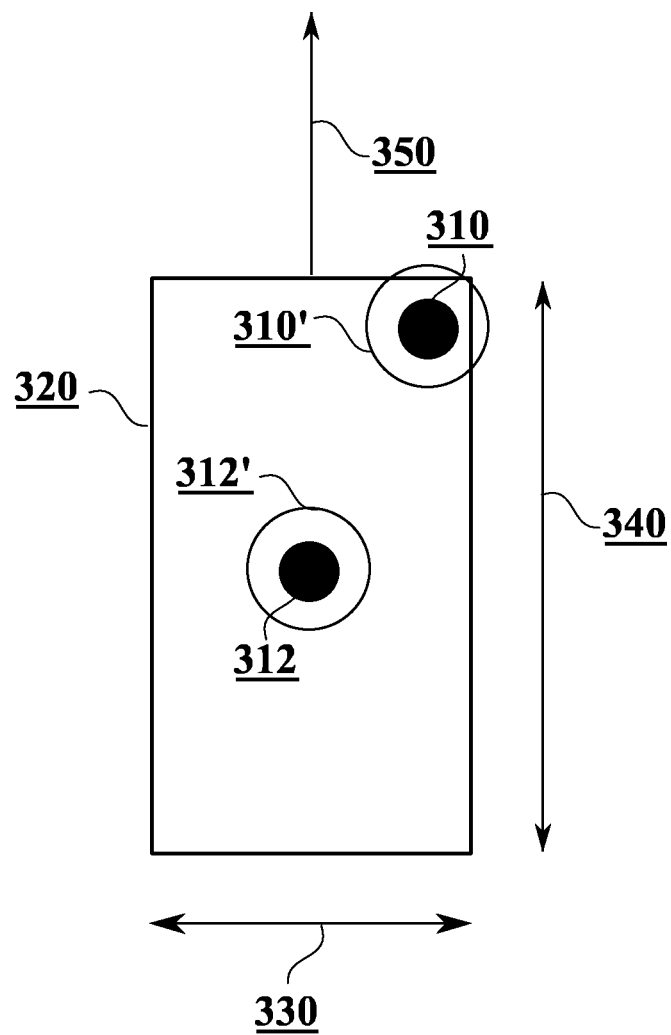
FIG. 3 illustrates a second example about locations of a first mobile terminal and a vehicle in accordance with at least some embodiments.

FIG. 3 illustrates a second example about locations of a first mobile terminal and a vehicle in accordance with at least some embodiments. With reference to FIG. 2, elements 310-350 in FIG. 3 may correspond to elements 210-250 in FIG. 2, respectively. However, as shown in the second example about locations of the first mobile terminal and the vehicle in FIG. 3, estimated position of the first mobile terminal 310 may be within the bounding box of vehicle 320. In such a case, the first mobile terminal may be determined as not being a VRU, i.e., a false VRU. Thus, the first mobile terminal may not be included in collision prediction, i.e., the network unit may refrain from transmitting warning messages to the first mobile terminal.

Figure 4:
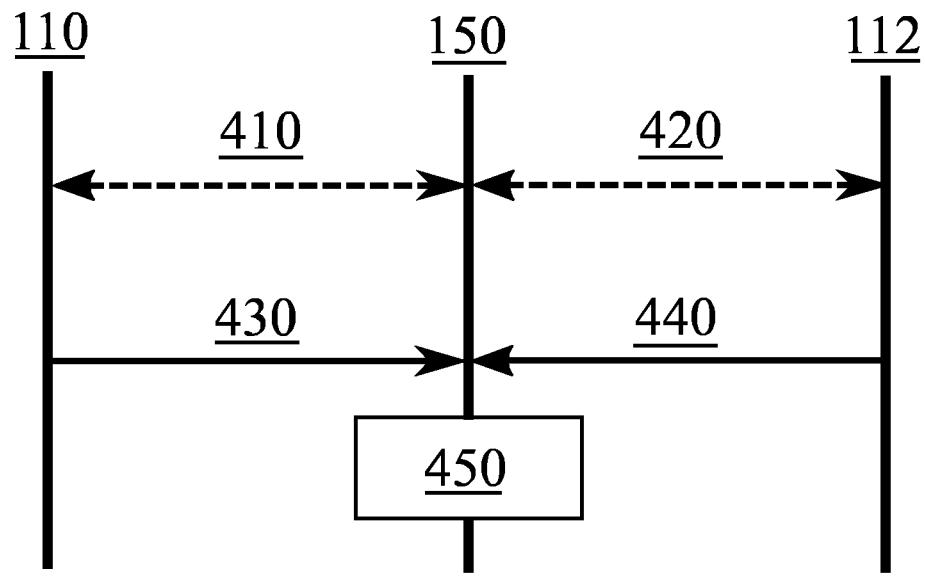
FIG. 4 illustrates a first exemplary signalling graph in accordance with at least some embodiments.

FIG. 4 illustrates a first exemplary signalling graph in accordance with at least some embodiments. With reference to FIG. 1, FIG. 4 demonstrates signalling between first mobile terminal 110, network unit 150 and second mobile terminal 112. At step 410, LPP communication may take place between first mobile terminal 110 and network unit 150. At step 420, LPP communication may take place between network unit 150 and second mobile terminal 112.

At step 430, first mobile terminal 110 may transmit information about a status of first mobile terminal 110 to network unit 150. The information about the status of first mobile terminal 110 may comprise, for example, a speed of first mobile terminal 110. Alternatively, or in addition, the information about the status of first mobile terminal 110 may comprise a direction of first mobile terminal 110. In some embodiments, the information about the status of first mobile terminal 110 may comprise a location of first mobile terminal 110.

Furthermore, in some embodiments, the information about the status of first mobile terminal 110 may comprise information related to connectivity, e.g., to indicate whether first mobile terminal 110 is associated with a wireless network of vehicle 120. For instance, first mobile terminal 110 may be associated with a wireless network of vehicle 120 if first mobile terminal 110 is logged or connected to the wireless network of vehicle 120, first mobile terminal 110 has established a radio link to the wireless network of vehicle 120, or first mobile terminal 110 has received a broadcast signal, such as a beacon, from the wireless network of vehicle 120. The wireless network of vehicle 120 may be, e.g., a WLAN. Alternatively, or in addition, said information related to connectivity may a Received Signal Strength Indication, RSSI, or some other estimated information about the wireless network of vehicle 120.

Moreover, the information related to connectivity may comprise an identifier of the wireless network. For instance, the information related to connectivity may comprise a WLAN access key, an IP address, or any other identifier.

In some embodiments, first mobile terminal 110 may, at step 430, transmit information about a type of first mobile terminal 110, wherein the type of first mobile terminal 110 indicates that first mobile terminal 110 is a personal device.

At step 440, second mobile terminal 112 may transmit information about a status of second mobile terminal 112 and/or information about a vehicle, such as vehicle 120 of FIG. 1. The information about the status of second mobile terminal 112 may comprise, for example, a speed of second mobile terminal 112. Alternatively, or in addition, the information about the status of second mobile terminal 112 may comprise a direction of second mobile terminal 112. In some embodiments, the information about the status of second mobile terminal 112 may comprise a location of second mobile terminal 112. The information about the vehicle may comprise for example a size and/or a location of the vehicle.

At step 440, second mobile terminal 112 may transmit information about a type of second mobile terminal 112, wherein the type may indicate that second mobile terminal 112 is associated with a vehicle, such as vehicle 120. Network unit 150 may determine that second mobile terminal 112 is associated with the vehicle based on the received information about the type of second mobile terminal 112, e.g., network unit 150 may classify second mobile terminal 112 as a vehicle, or a device associated with the vehicle. For example, second mobile terminal 112 may be embedded into the vehicle.

At step 450, network unit 150 may also determine that first mobile terminal 110 is a personal device and second mobile terminal 112 is associated with the vehicle. In some embodiments, network unit 150 may determine that first mobile terminal 110 is a personal device based on the received information about the type of first mobile terminal 110, e.g., network unit 150 may classify first mobile terminal 110 as a personal device, such as a handheld or a wearable device.

Upon receiving at least the information about the status of first mobile terminal 110, network unit 150 may, at step 450, determine whether first mobile terminal 110 is a VRU with respect to the vehicle based at least partly on the received information about the status of first mobile terminal 110. The determination of whether first mobile terminal 110 is a VRU with respect to the vehicle may also comprise determining whether first mobile terminal 110 is a true or a false VRU and possibly the confidence of such decision.

The determination whether first mobile terminal 110 is a VRU with respect to the vehicle may also be based on at least one of the received information about the status of second mobile terminal 112, type of first mobile terminal 110, type of second mobile terminal 112 and information about the vehicle. For example, network unit 150 may compare a speed of first mobile terminal 110 and a speed of second mobile terminal 112. If the speeds are similar, e.g., difference is smaller than a threshold value, network unit 150 may determine that first mobile terminal 110 is not a VRU. However, if the difference between speeds of first mobile terminal 110 and second mobile terminal 112 is larger than the threshold, network unit 150 may determine that first mobile terminal 110 is a VRU.

In some embodiments, other techniques based on time correlation of the two sequences may be exploited as well. For instance, if the normalized cross-correlation between the two speed sequences in time assumes relevant values (close to 1) for a given observation window, it may be deduced based on the normalized cross-correlation that first mobile terminal 110 and second mobile terminal 112 move with the same speed, or about the same speed, at the same time, or about the same time. Hence mobile terminal 110 is likely to be on board the vehicle associated with mobile terminal 112. Therefore, the final true-false VRU decision may also be based on such normalized cross-correlation value.

If first mobile terminal 110 is determined as a VRU, i.e., a true VRU, network unit 150 may consider first mobile terminal in collision prediction and transmit at least one warning message to first mobile terminal 110, if a collision is predicted. On the other hand, if first mobile terminal 110 is determined as not being a VRU, i.e., a false VRU, network unit 150 may not consider first mobile terminal 110 in collision prediction and refrain from transmitting said at least one warning message to first mobile terminal 110. Likelihood that the determination was correct, i.e., confidence information, may be determined as well.

Figure 5:
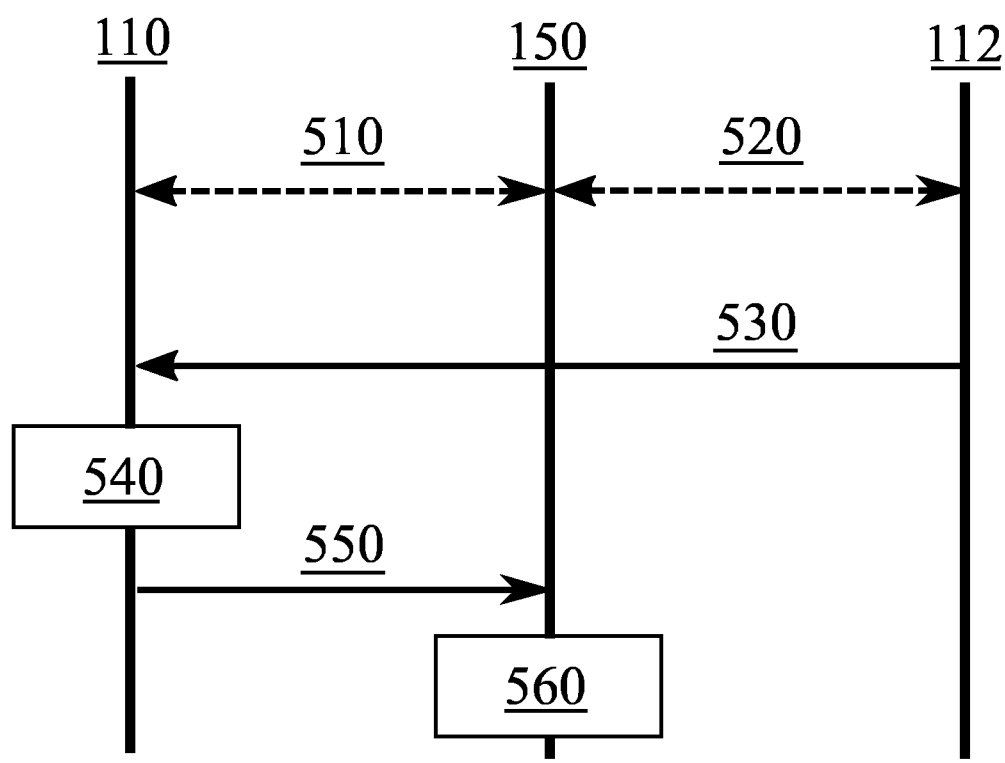
FIG. 5 illustrates a second exemplary signalling graph in accordance with at least some embodiments.

FIG. 5 illustrates a second exemplary signalling graph in accordance with at least some embodiments. FIG. 5 demonstrates signalling between first mobile terminal 110, network unit 150 and second mobile terminal 112. At step 510, LPP communication may take place between first mobile terminal 110 and network unit 150. At step 520, LPP communication may take place between network unit 150 and second mobile terminal 112.

At step 530, second mobile terminal 112 may transmit information about a status of second mobile terminal 112 to first mobile terminal 110. The information about the status of second mobile terminal 112 may comprise, for example, a speed, location and/or an identifier of second mobile terminal 112. The identifier may comprise a unique identifier. In some embodiments, the identifier may comprise information related to a category, such as "Car", "Bus", "Train", etc.

Alternatively, or in addition, second mobile terminal 112 may transmit information about a vehicle, such as vehicle 120 of FIG. 1, to first mobile terminal 110. The information about the vehicle may comprise a size of the vehicle. Second mobile terminal 112 may transmit information about a status of second mobile terminal 112 and/or information about the vehicle to first mobile terminal 110 using unicast, broadcast or multicast transmission in accordance with any RAT, such as WLAN, Bluetooth, LTE, NR etc.

At step 540, first mobile terminal 110 may estimate whether it is a VRU with respect to the vehicle, such as vehicle 120, based on the received information about the status of second mobile terminal 112 and/or information about the vehicle. First mobile terminal 110 may also estimate correctness of the estimate, i.e., assess confidence that the estimated status is correct based on the received information, to generate confidence information.

For instance, first mobile terminal 110 may estimate that it is a VRU, i.e., a true VRU, with respect to the vehicle if it does not receive periodic messages from second mobile terminal 112 comprising information about the status of second mobile terminal 112 and/or information about the vehicle. Alternatively, or in addition, first mobile terminal 110 may estimate that it is a VRU with respect to the vehicle if it is not associated with a wireless network of the vehicle, e.g., not logged in the WLAN of the vehicle, or if it does not have a radio connection to the vehicle. On the other hand, if any of the above conditions is true, first mobile terminal 110 may estimate that it is not a VRU, i.e., first mobile terminal 110 is a false VRU.

In some embodiments, first mobile terminal 110 may estimate that it is a VRU based on a location and size of a vehicle, such as vehicle 120, similarly as network unit 150 in the example of FIG. 4. Alternatively, or in addition, first mobile terminal 110 may compare a speed of the vehicle with its own speed. If the difference between the speed of the vehicle and speed of first mobile terminal 110 is larger than a threshold, first mobile terminal 110 may determine that it is a VRU.

Time correlation of the sequences may be exploited as well, i.e., if a normalized cross-correlation between two speed sequences in time gives relevant values (close to 1 or within a threshold associated with the normalized cross-correlation) for a given observation window, it may be deduces deduce that first mobile terminal 110 and vehicle 120 move with same speed, or about the same speed, at the same time, or about the same time. Hence mobile terminal 110 is likely to be on board the vehicle. Therefore, the final true-false VRU decision may also be based on such normalized cross-correlation value.

At step 550, first mobile terminal 110 may transmit information about the status of first terminal 110, comprising an estimate indicating whether first mobile terminal 110 was estimated as a VRU with respect to the vehicle by first mobile terminal 110. In some embodiments, first mobile terminal 110 may also transmit confidence information associated with estimated correctness of the estimate.

Step 560 of FIG. 5 may correspond to step 450 of FIG. 4. At step 560, network unit 150 may determine that a first mobile terminal is a personal device and a second mobile terminal is associated with the vehicle. Network unit 150 may also determine whether first mobile terminal 110 is a VRU, with respect to the vehicle based at least partly on the received information about the status of first mobile terminal 110.

If first mobile terminal is determined as a VRU, i.e., a true VRU, network unit 150 may consider first mobile terminal 110 in collision prediction and transmit at least one warning message to first mobile terminal 110, if a collision is predicted. On the other hand, if first mobile terminal 110 is determined as not being a VRU, i.e., a false VRU, network unit 150 may not consider first mobile terminal 110 in collision and refrain from transmitting said at least one warning message to first mobile terminal 110.

Figure 6:
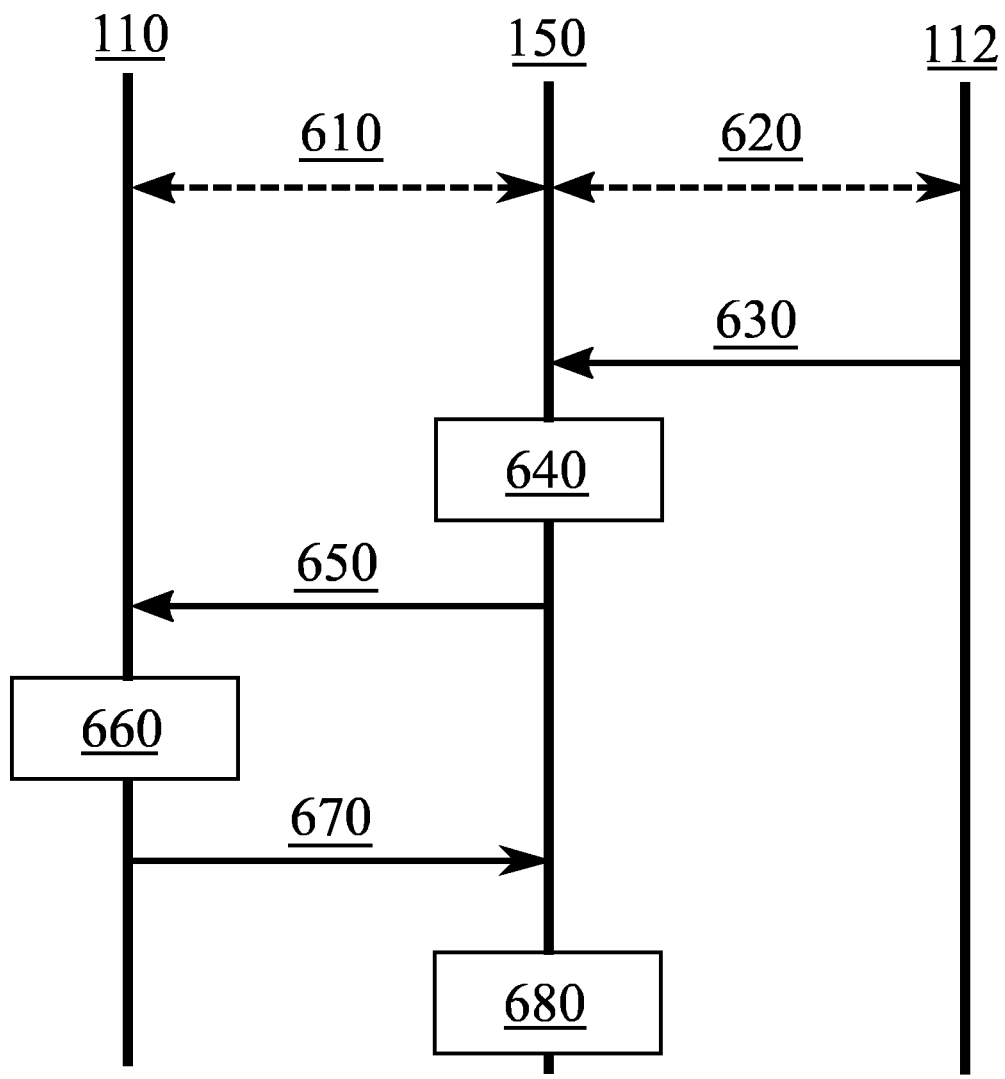
FIG. 6 illustrates a third exemplary signalling graph in accordance with at least some embodiments.

FIG. 6 illustrates a third exemplary signalling graph in accordance with at least some embodiments. Signalling illustrated in FIG. 6 may be exploited, e.g., if a direct communication between first mobile terminal 110 and second mobile terminal 112 is not available or if it is desirable that network unit 150 controls the operation for any reason. FIG. 6 demonstrates signalling between first mobile terminal 110, network unit 150 and second mobile terminal 112. At step 610, LPP communication may take place between first mobile terminal 110 and network unit 150. At step 620, LPP communication may take place between network unit 150 and second mobile terminal 112.

At step 630, second mobile terminal may transmit information about the status of second mobile terminal 112 and/or information about a vehicle, such as vehicle 120 of FIG. 1, to network unit 150. At step 640, network unit 150 may identify, based at least partly on the received information, at least one mobile terminal, such as first mobile terminal 110, which is in vicinity, or in the proximity, of second mobile terminal 112 or the vehicle. The identification may be based on locations of mobile terminals.

At step 650, network unit 150 may transmit at least a part of the information about the status of second mobile terminal 112 or the vehicle to the identified at least one mobile terminal, such as first mobile terminal 110. In general, network unit 150 may distribute information received from each vehicle, possibly together with estimated locations of vehicles, to all mobile terminals that were determined as personal devices in the proximity of each vehicle.

At step 660, first mobile terminal 110 may estimate whether it is a VRU with respect to a vehicle, such as vehicle 120, based on the information received from network unit 150, similarly as at step 540 of FIG. 5. First mobile terminal 110 may also estimate correctness of the estimate, i.e., assess confidence that the estimated status is correct based on the received information, to generate confidence information.

Steps 670 and 680 of FIG. 6 may correspond to steps 550 and 560 of FIG. 5, respectively. Thus, at step 670, first mobile terminal 110 may transmit information about the status of first mobile terminal 110, wherein the information about the status of first mobile terminal 110 may comprise an estimate indicating whether first mobile terminal 110 was estimated as a VRU with respect to the vehicle by first mobile terminal 110. In some embodiments, first mobile terminal 110 may also transmit confidence information associated with estimated correctness of the estimate. Finally, at step 680, network unit 150 may determine whether first mobile terminal 110 is a VRU, with respect to the vehicle based at least partly on the received information about the status of first mobile terminal 110.

It should be noted that the exemplary embodiments of FIGS. 4, 5 and 6 may be combined. For example, any information about a status of first mobile terminal 110, a status of second mobile 112 and/or about the vehicle may be exploited by network unit 150 and/or first mobile terminal 110 for determining whether first mobile terminal 110 is a VRU, or not.

Moreover, the exemplary embodiments of FIGS. 4, 5 and 6 may also be combined so that first mobile terminal 110 and network unit 150 iteratively exchange estimates indicating whether first mobile terminal 110 is determined as a VRU with respect to the vehicle and confidence information associated with estimated correctness of the estimate. In some embodiments, post-processing of information about a status of first mobile terminal 110, a status of second mobile 112 and/or information about the vehicle may be performed, such as filtering or averaging over time.

Figure 7:
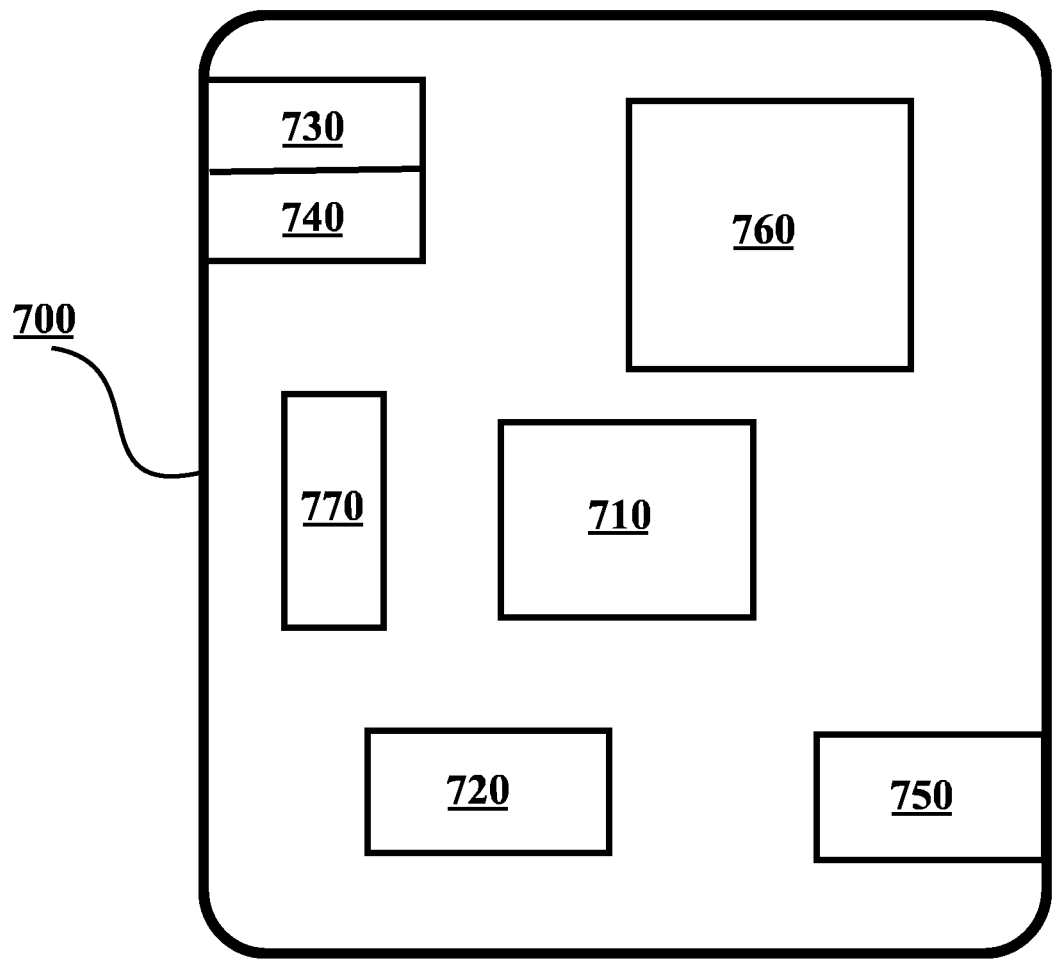
FIG. 7 illustrates an example apparatus capable of supporting at least some embodiments.

FIG. 7 illustrates an example apparatus capable of supporting at least some embodiments. Illustrated is device 700, which may comprise, for example, first mobile terminal 110 or network unit 150. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. A processing core may comprise, for example, a Cortex-A8 processing core manufactured by ARM Holdings or a Steamroller processing core produced by Advanced Micro Devices Corporation. Processor 710 may comprise at least one Qualcomm Snapdragon and/or Intel Atom processor. Processor 710 may comprise at least one application-specific integrated circuit, ASIC. Processor 710 may comprise at least one field-programmable gate array, FPGA. Processor 710 may be means for performing method steps in device 700. Processor 710 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise computer instructions that processor 710 is configured to execute. When computer instructions configured to cause processor 710 to perform certain actions are stored in memory 720, and device 700 overall is configured to run under the direction of processor 710 using computer instructions from memory 720, processor 710 and/or its at least one processing core may be considered to be configured to perform said certain actions. Memory 720 may be at least in part comprised in processor 710. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with Global System for Mobile communication, GSM, Wideband Code Division Multiple Access, WCDMA, 5G/NR, Long Term Evolution, LTE, IS-95, Wireless Local Area Network, WLAN, Ethernet and/or Worldwide Interoperability for Microwave Access, WiMAX, standards, for example.

Device 700 may comprise a Near-Field Communication, NFC, transceiver 750. NFC transceiver 750 may support at least one NFC technology, such as Bluetooth, or similar technologies.

Device 700 may comprise User Interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 730 and receiver 740, or via NFC transceiver 750, and/or to play games.

Device 700 may comprise or be arranged to accept a user identity module 770. User identity module 770 may comprise, for example, a Subscriber Identity Module, SIM, card installable in device 700. A user identity module 770 may comprise information identifying a subscription of a user of device 700. A user identity module 770 may comprise cryptographic information usable to verify the identity of a user of device 700 and/or to facilitate encryption of communicated information and billing of the user of device 700 for communication effected via device 700.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 700, from other devices comprised in device 700. Such a receiver may comprise a serial bus receiver arranged to, for example, receive information via at least one electrical lead from receiver 740 for processing in processor 710. Alternatively to a serial bus, the receiver may comprise a parallel bus receiver.

Device 700 may comprise further devices not illustrated in FIG. 7. For example, where device 700 comprises a smartphone, it may comprise at least one digital camera. Some devices 700 may comprise a back-facing camera and a front-facing camera, wherein the back-facing camera may be intended for digital photography and the front-facing camera for video telephony. Device 700 may comprise a fingerprint sensor arranged to authenticate, at least in part, a user of device 700. In some embodiments, device 700 lacks at least one device described above. For example, some devices 700 may lack a NFC transceiver 750 and/or user identity module 770.

Processor 710, memory 720, transmitter 730, receiver 740, NFC transceiver 750, UI 760 and/or user identity module 770 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected without departing from the scope of the embodiments.

Figure 8:
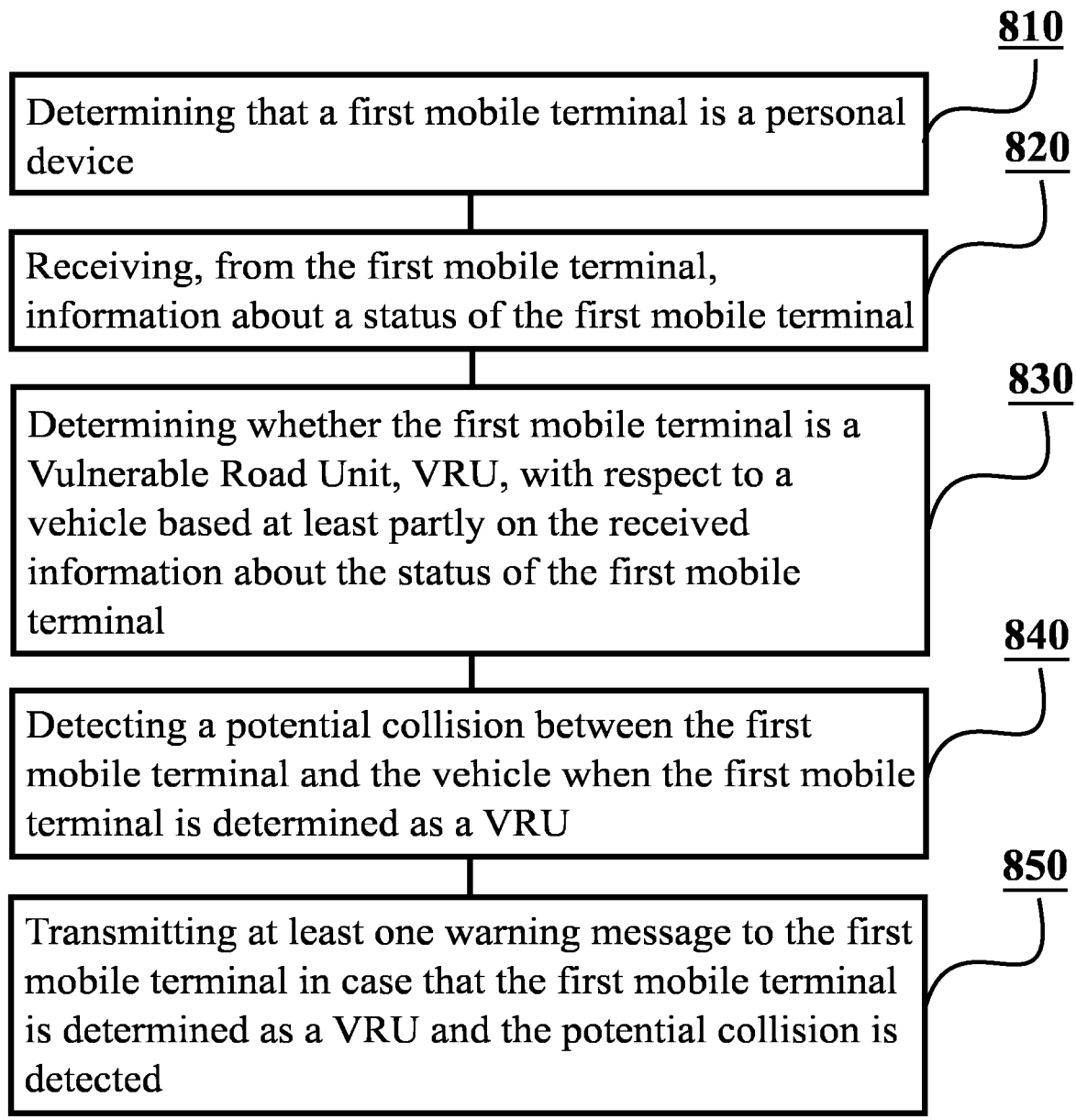
FIG. 8 illustrates a flow graph of a first method in accordance with at least some embodiments.

FIG. 8 is a flow graph of a first method in accordance with at least some embodiments. The phases of the illustrated first method may be performed by network unit 150 or by a control device configured to control the functioning thereof, possibly when installed therein.

The first method may comprise, at step 810, determining that a first mobile terminal is a personal device. The first method may also comprise, at step 820, receiving, from the first mobile terminal, information about a status of the first mobile terminal and, at step 830, determining whether the first mobile terminal is a Vulnerable Road User, VRU, with respect to the vehicle based at least partly on the received information about the status of the first mobile terminal. The method may also comprise, at step 840, detecting a potential collision between the first mobile station and the vehicle when the first mobile terminal is determined as a VRU. Finally, the first method may comprise, at step 850, transmitting at least one warning message to the first mobile terminal in case that the first mobile terminal is determined as a VRU and the potential collision is detected.

Figure 9:
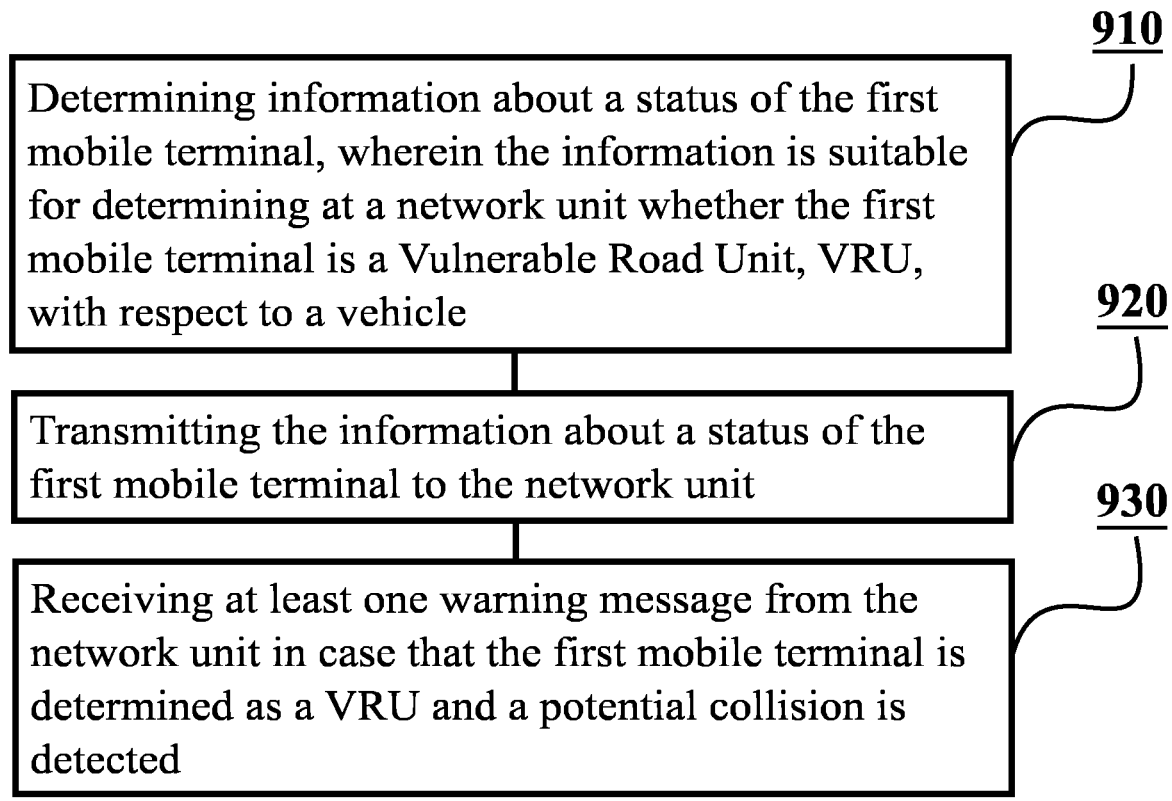
FIG. 9 illustrates a flow graph of a second method in accordance with at least some embodiments.

FIG. 9 is a flow graph of a second method in accordance with at least some embodiments. The phases of the illustrated second method may be performed by first mobile 110, e.g., by a UE, or by a control device configured to control the functioning thereof, possibly when installed therein.

The second method may comprise, at step 910, determining information about a status of the first mobile terminal, wherein the information is suitable for determining at a network unit whether the first mobile terminal is a Vulnerable Road User, VRU, with respect to a vehicle. The second method may also comprise, at step 920, transmitting the information about the status of the first mobile terminal to the network unit. Finally, the second method may comprise, at step 930, receiving at least one warning message from the network unit in case that the mobile terminal is determined as a VRU and a potential collision is detected.

It is to be understood that the embodiments disclosed are not limited to the particular structures, process steps, or materials disclosed herein, but are extended to equivalents thereof as would be recognized by those ordinarily skilled in the relevant arts.

It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member.

Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, network unit 150 or first mobile terminal 110, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, network unit 150 or first mobile terminal 110, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in wireless communication networks. More specifically, at least some embodiments find industrial application in cellular communication networks, such as in 5G/NR networks.

Acronyms List

3GPP 3rd Generation Partnership Project
BS Base Station
E-SMLC Evolved Serving Mobile Location Center
GPS Global Positioning System
GSM Global System for Mobile communication
IEEE Institute of Electrical and Electronics Engineers
IMU Inertial Measurement Unit
IoT Internet of Things
LPP LTE Positioning Protocol
LTE Long-Term Evolution
M2M Machine-to-Machine
MEC Mobile Edge Computing
MTC Machine-Type Communications
NFC Near-Field Communication
NR New Radio
RAT Radio Access Technology
RS Reference Signal
SIM Subscriber Identity Module
UE User Equipment
UI User Interface
VRU Vulnerable Road User
WCDMA Wideband Code Division Multiple Access
WiMAX Worldwide Interoperability for Microwave Access
WLAN Wireless Local Area Network

| REFERENCE SIGNS LIST | |
|---|---|
| 110 | First wireless terminal, e.g., first UE |
| 112 | Second wireless terminal, e.g., second UE |
| 120, 220, 320 | Vehicle |
| 130 | Wireless network node, e.g., BS |
| 140 | Core network |
| 150 | Network unit |
| 115, 135, 145 | Interfaces |
| 210, 212, 310, 312 | Estimated positions |
| 210', 212', 310', 312' | Uncertainty areas |
| 230, 330 | Width of vehicle 220 |
| 240, 340 | Length of vehicle 220 |
| 250, 350 | Driving direction |
| 410-450 | Steps in the first exemplary signalling graph |
| 510-560 | Steps in the second exemplary signalling graph |
| 610-680 | Steps in the third exemplary signalling graph |
| 700-770 | Structure of the apparatus of FIG. 7 |
| 810-850 | Phases of the first method in FIG. 8 |
| 910-930 | Phases of the second method in FIG. 9 |

The invention claimed is:

1. A method for a network unit, comprising:
   determining that a first mobile terminal is a personal device;
   receiving, from the first mobile terminal, information about a status of the first mobile terminal;
   determining whether the first mobile terminal is a Vulnerable Road User, VRU, with respect to a vehicle based at least partly on the received information about the status of the first mobile terminal;
   transmitting, to the first mobile terminal, an estimate indicating whether the first mobile terminal is determined as a VRU with respect to the vehicle and confidence information associated with estimated correctness of the estimate;
   detecting a potential collision between the first mobile terminal and the vehicle when the first mobile terminal is determined as a VRU; and
   transmitting at least one warning message to the first mobile terminal in case that the first mobile terminal is determined as a VRU and the potential collision is detected.

2. A method according to claim 1, further comprising:
   receiving information about a status of a second mobile terminal or information about the vehicle; and determining whether the first mobile terminal is a VRU with respect to the vehicle based at least partly on the received information about the status of the second mobile terminal or information about the vehicle.

3. A method according to claim 2, wherein the received information about the status of the first mobile terminal comprises a location of the first mobile terminal, the method further comprising:
receiving information about a size and location of the vehicle from the second mobile terminal; and
determining whether the first mobile terminal is a VRU based on the location of the first mobile terminal and the size and location of the vehicle.

4. A method according to claim 3, further comprising:
estimating whether the first mobile terminal is within the vehicle based on the location of the first mobile terminal; and
determining that the first mobile terminal is a VRU when the first mobile terminal is not within the vehicle.

5. A method according to claim 1, wherein the received information about the status of the first mobile terminal comprises a speed of the first mobile terminal, the method further comprising:
receiving information about a speed of the vehicle or a speed of a second mobile terminal; and
determining whether the first mobile terminal is a VRU based on the speed of the first mobile terminal and the speed of the vehicle or a second mobile terminal.

6. A method according to claim 1, further comprising:
receiving information about a status of a second mobile terminal or the vehicle;
identifying, based at least partly on the received information about the status of the second mobile terminal or the vehicle, at least one mobile terminal that is in proximity of the second mobile terminal or the VRU; and
transmitting at least a part of the information about the status of the second mobile terminal or the vehicle to the identified at least one mobile terminal.

7. A method according to claim 1, wherein the personal device is a handheld or a wearable device but not associated with any vehicle.

8. A method for a first mobile terminal, comprising:
determining information about a status of the first mobile terminal, wherein the information is suitable for determining at a network unit whether the first mobile terminal is a Vulnerable Road User, VRU, with respect to a vehicle;
transmitting the information about the status of the first mobile terminal to the network unit;
receiving, from the network unit, an estimate indicating whether the first mobile terminal is determined as a VRU with respect to the vehicle and confidence information associated with estimated correctness of the estimate; and
receiving at least one warning message from the network unit in case that the first mobile terminal is determined as a VRU and a potential collision with the vehicle is detected.

9. A method according to claim 8, wherein the transmitted information about the status of the first mobile terminal comprises an estimate indicating whether the first mobile terminal is a VRU with respect to the vehicle.

10. A method according to claim 9, wherein the transmitted information about the status of the first mobile terminal comprises confidence information associated with estimated correctness of the estimate.

11. A method according to claim 8, wherein transmitted information about the status of the first mobile terminal comprises a location of the first mobile terminal, a speed of the first mobile terminal and/or information related to connectivity indicating whether the first mobile terminal is associated with a wireless network of the vehicle.

12. A method according to claim 8, further comprising:
receiving, from a second mobile terminal associated with the vehicle or from the network unit, information about a status of the second mobile terminal or information about the vehicle; and
determining whether the first mobile terminal is a VRU based on the received information.

13. A method according to claim 12, wherein the information about the status of the second mobile terminal or the information about the vehicle comprises a speed, location and/or direction of the second mobile terminal or the vehicle.

14. An apparatus comprising at least one processing core and at least one non-transitory memory including computer readable instructions stored thereon that, when executed by the at least one processing core, are configured to cause the apparatus at least to perform:
determine that a first mobile terminal is a personal device;
receive, from the first mobile terminal, information about a status of the first mobile terminal;
determine whether the first mobile terminal is a Vulnerable Road User, VRU, with respect to a vehicle based at least partly on the received information about the status of the first mobile terminal;
transmit, to the first mobile terminal, an estimate indicating whether the first mobile terminal is determined as a VRU with respect to the vehicle and confidence information associated with estimated correctness of the estimate;
detect a potential collision between the first mobile terminal and the vehicle when the first mobile terminal is determined as a VRU; and
transmit at least one warning message to the first mobile terminal in case that the first mobile terminal is determined as a VRU and the potential collision is detected.

15. The apparatus of claim 14, wherein the VRU includes a pedestrian.

16. The apparatus of claim 14, wherein the VRU includes a cyclist.

17. The apparatus of claim 14, wherein the VRU includes a wheelchair driver.

* * * * *